Oct. 15, 1935.  C. H. F. COTTEE  2,017,586
DEHYDRATING GLAUBER'S SALT AND THE LIKE
Filed May 31, 1933
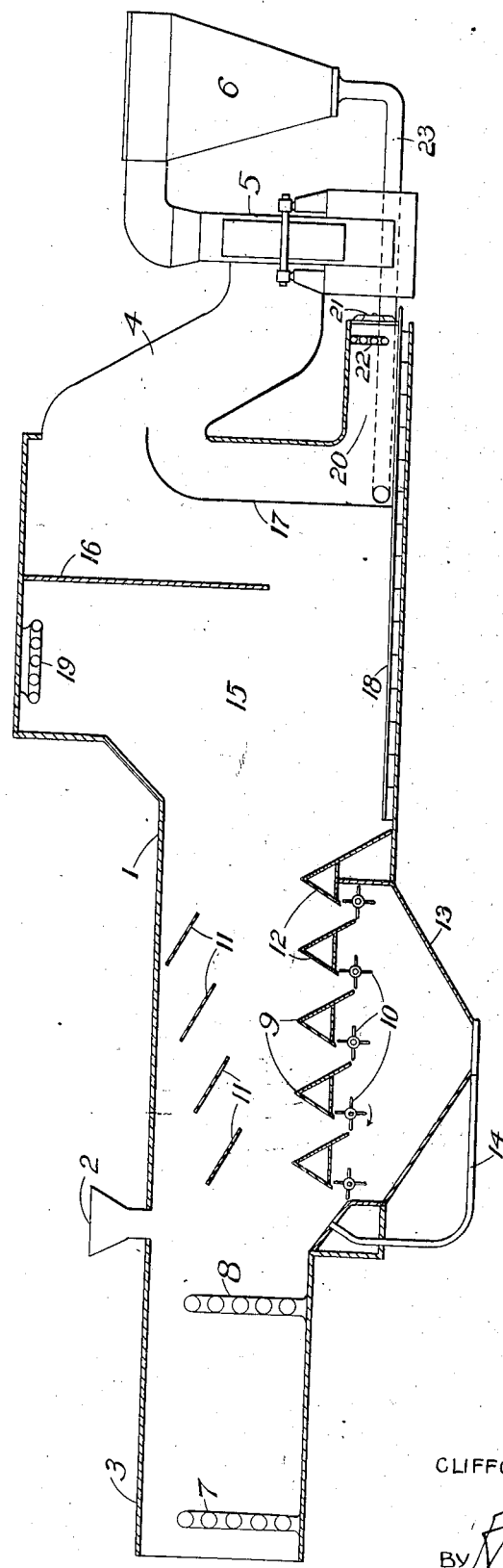
INVENTOR:
CLIFFORD H. F. COTTEE
BY H. E. macRae
ATTORNEY.

Patented Oct. 15, 1935

2,017,586

UNITED STATES PATENT OFFICE 2,017,586

DEHYDRATING GLAUBER'S SALT AND THE LIKE

Clifford Hethrington Frank Cottee, Ottawa, Ontario, Canada

Application May 31, 1933, Serial No. 673,588

5 Claims. (Cl. 34—24)

This invention relates to drying granular or like material and is particularly directed to a method and apparatus for dehydrating Glauber's salt.

It has heretofore been proposed to repeatedly project upwardly granular or grain-sized material in its forward movement in countercurrent to a stream of drying air.

An object of the present invention is to avoid or greatly reduce the carrying away of fine particles by the current of air. A further object is to provide for greater efficiency in drying the Glauber's salt or like material. Other objects of the invention will appear from the description to follow.

The invention will now be described with reference to the accompanying drawing which illustrates in sectional elevation, more or less diagrammatically, apparatus for carrying out the invention.

In the drawing 1 represents a drying chamber having a material-charging hopper or the like 2, an air inlet 3 and an air outlet 4 connected with a suction fan 5 which discharges into a dust collector 6. Associated with the air inlet 3 are means for precipitating moisture from the air and means for raising the temperature of the air after the moisture has been removed so as to increase the capacity of the air for removing moisture from the granular or like material.

The means for precipitating moisture from the air are diagrammatically illustrated by the coil 7 at the entrance of the air inlet, through which, for example, in warm weather, water from springs adjacent to or in the salt lake from which the salt is obtained may be circulated while the incoming air circulates about the coil, or the same result may be obtained by allowing the incoming air to pass through a fine spray of this spring water or other cool water. During the warm summer season the temperature of the water in these springs is sufficiently below that of the atmosphere to be capable of precipitating from the air much of its moisture. The air heating means are illustrated by the coil 8 located in the air inlet passage 3 adjacent the drying chamber. Through this coil steam or hot water may be circulated and suitable regulators installed so that the temperature in these coils may be automatically maintained at any desired constant temperature.

At the bottom of the forward end of the drying chamber are located a plurality of inverted V-shaped members 9 and rapidly rotating propellers 10. Inclined baffles 11 are arranged above and parallel with the trough-forming members 9, so that as the material is projected upwardly by the propellers 10 under the direction of the forwardly inclined wall 12 of each trough it strikes successive baffles and is deflected downwardly and moves forward at the same time. Any desired number of these trough-forming members and propellers may be used. A hopper 13 is arranged below the propellers to collect any material which may escape through the propellers and this material is returned to the drying chamber by any suitable means such as air under pressure forced through the pipe 14.

Beyond the agitator zone the drying chamber is enlarged to form a relatively quiescent zone 15 in which the velocity of the air is greatly reduced so that the substantially dry material will settle and not be substantially carried away with the air. A baffle 16 projects downwardly into this zone and the partition 17 directs the air upwardly to the outlet 4. Means for discharging the material, such as a rake 18, is disposed along the floor as indicated. A coil 19 is arranged adjacent the top of the quiescent zone and steam or hot water may be circulated through this coil to raise the temperature of the air and further assist the drying operation.

An auxiliary drying zone 20 is provided at the discharge end of the chamber. This zone has a damper-controlled air inlet 21 adjacent to which is disposed means 22 for heating the incoming air. This may be a steam or hot water coil, or the heat may be developed by electricity and the heating elements may be either above or below the trough in which the rake or conveyor operates.

From the bottom of the dust collector, means 23 are preferably provided for conveying the fine particles from the dust collector back to the auxiliary drying zone as shown. This means 23 may include a screw-conveyor or the like, not shown.

In the operation of the process the granular material is continuously fed through the hopper 2 while the fan 5 draws air into the chamber through the moisture precipitating means 7 and air-heating means 8. The use of these cooling and heating means will be determined by the condition of the air which will vary with temperature and humidity conditions of the atmosphere. Material falling into the propeller troughs will be repeatedly thrown upwardly against the baffles 11 and will be continuously moved forward in renewed contact with the drying air. The velocity of the air upon leaving the agitating zone will be greatly reduced so that practically all of the dried material will settle and be removed with the rake 16, the air substantially free from material passing to the fan and dust collector. Heating of the air in the quiescent zone 15 assists the more slowly moving air in absorbing more moisture. As the substantially dry material passes beyond the partition 17 it enters the auxiliary drying zone 20. The suction of the fan draws air from this zone and the amount of air passing therethrough is regulated by the damper 21 in accordance with the extent to which further drying is required. Material which settles in the dust collector is preferably continuously or periodically returned to the auxiliary heating zone where it is reunited and mixed with the main portion of dried material.

It will be understood that in the drying of Glauber's salt the temperature of the drying air should not exceed 33° C., since otherwise the material would tend to go into aqueous fusion. While the invention is primarily directed to the dehydrating of Glauber's salt, it may be used for drying any other granular or like material, such as Epsom salts, grains, silica sand or the like.

I claim:

1. A method of drying granular material in a moving current of air which comprises passing the material and drying air in the same direction in continuous flow through a unitary drying chamber, agitating the material in one portion of the chamber to successively project the material into the drying current of air during the foreward movement of the material, substantially reducing the velocity and obstructing the flow of the material-laden air in an enlarged portion of the chamber, discharging the air, and separately withdrawing along the floor of the chamber the dried material precipitated therein.

2. A method as defined in claim 1 wherein the temperature of the more slowly moving air in the enlarged portion of the chamber is increased.

3. Apparatus for drying granular or like material in a moving current of air which comprises a unitary chamber having therein an agitating portion and an enlarged velocity-reducing portion to separate suspended material from said air, a baffle in said enlarged portion to obstruct the air flow and precipitate solids, means for drawing air through said chamber, means for feeding said material to the chamber, means in said agitating portion for successively projecting the material into the air current and for moving it forwardly in the direction of the flow of the air and means for withdrawing dried material along the floor of said chamber.

4. Apparatus as defined in claim 3 having means in said velocity-reducing portion of the chamber for raising the temperature of air therein.

5. Apparatus as defined in claim 3, having an auxiliary drying zone adjacent said outlet having a controlled air inlet and means for heating air admitted to said auxiliary zone, said zone being under the influence of the fan.

CLIFFORD H. F. COTTEE.